United States Patent [19]

Yoshizawa

[11] Patent Number: 5,570,607
[45] Date of Patent: Nov. 5, 1996

[54] LEVER APPARATUS HAVING STATIONARY FULCRUM, MOVABLE FORCE POINT AND MOVABLE ACTION POINT, AND MACHINE WHICH INCORPORATES THE SAME

[75] Inventor: Yasuo Yoshizawa, Yonezawa, Japan

[73] Assignee: Yoshiki Industrial Co., Ltd., Yamagata-ken, Japan

[21] Appl. No.: 256,937
[22] PCT Filed: Dec. 28, 1992
[86] PCT No.: PCT/JP92/01719
    § 371 Date: Jul. 27, 1994
    § 102(e) Date: Jul. 27, 1994
[87] PCT Pub. No.: WO94/15117
    PCT Pub. Date: Jul. 7, 1994
[51] Int. Cl.⁶ .................................................. F16H 21/44
[52] U.S. Cl. ........................................................... 74/110
[58] Field of Search .................................................. 74/110

[56] References Cited

U.S. PATENT DOCUMENTS 3,367,197  2/1968  Tabor et al. ........................... 74/110
4,317,383  3/1982  Kurosaki et al. ....................... 74/110
5,182,967  2/1993  Yoshizawa et al. .

FOREIGN PATENT DOCUMENTS 49-2982   1/1974  Japan .
41-6555   7/1988  Japan .
63-35102  7/1988  Japan .

OTHER PUBLICATIONS

"10 Ways to Change Straight–line Direction", *Product Engineering*, Feb. 29, 1960.

Primary Examiner—Rodney H. Bonck
Assistant Examiner—MaryAnn Battista
Attorney, Agent, or Firm—Frishauf, Holtz, Goodman, Langer & Chick

[57] ABSTRACT

A fulcrum of a lever member which is rotatably supported by a stationary shaft has force and action points provided with a force point regulator and an action point regulator, respectively. Each of the regulators has a roller and a pair of guide plates guiding the roller between the guide plates as the lever member is rotated about the fulcrum supported by the stationary shaft.

4 Claims, 16 Drawing Sheets

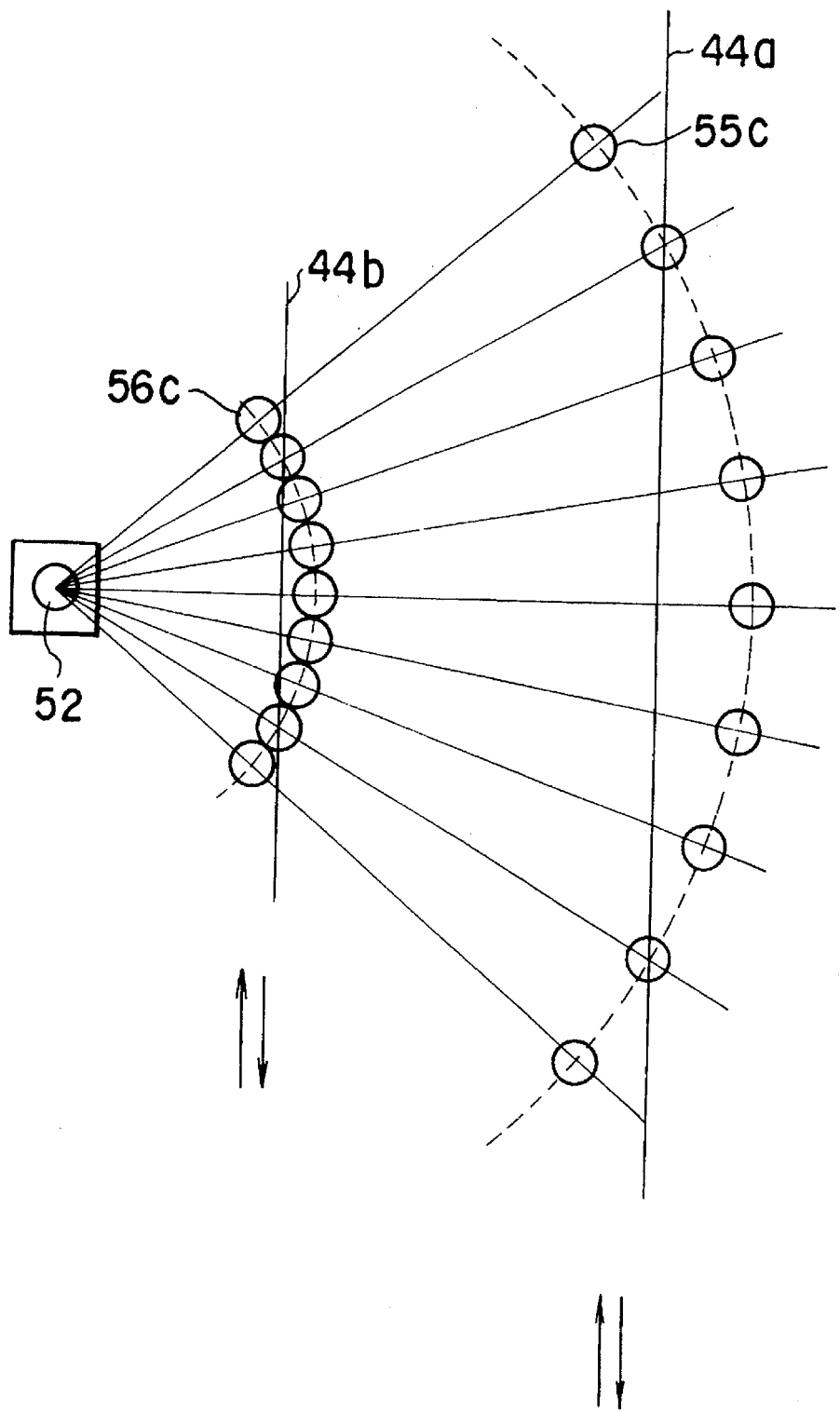
F I G. 11

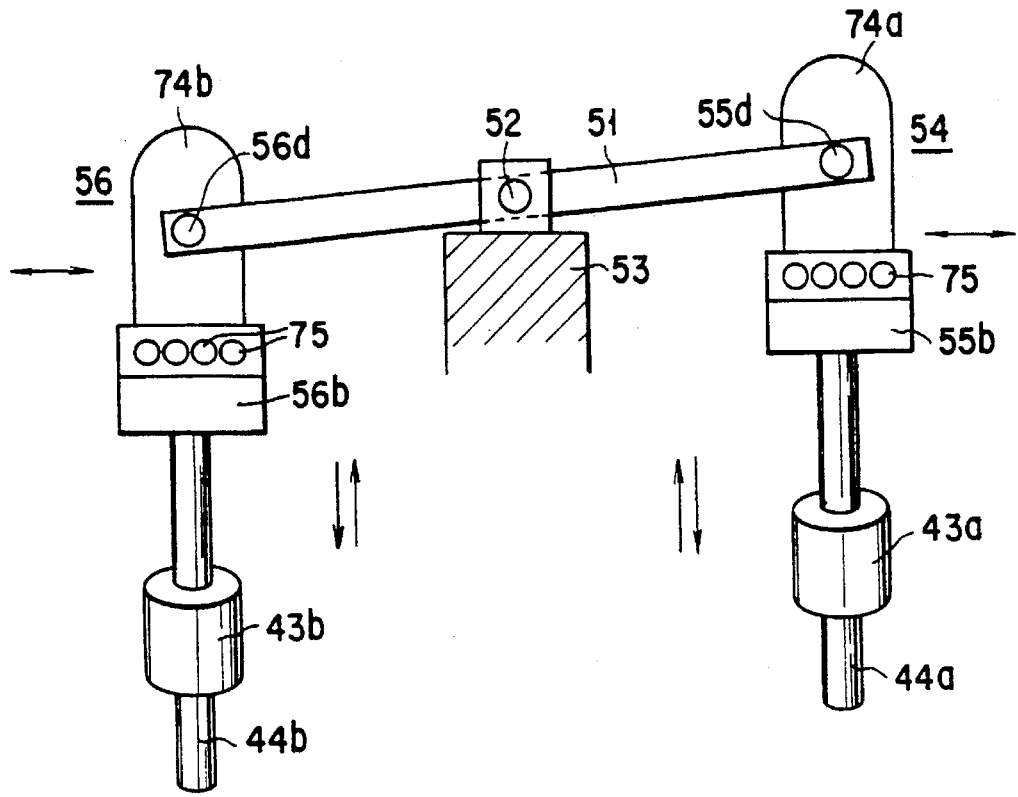
F I G. 16
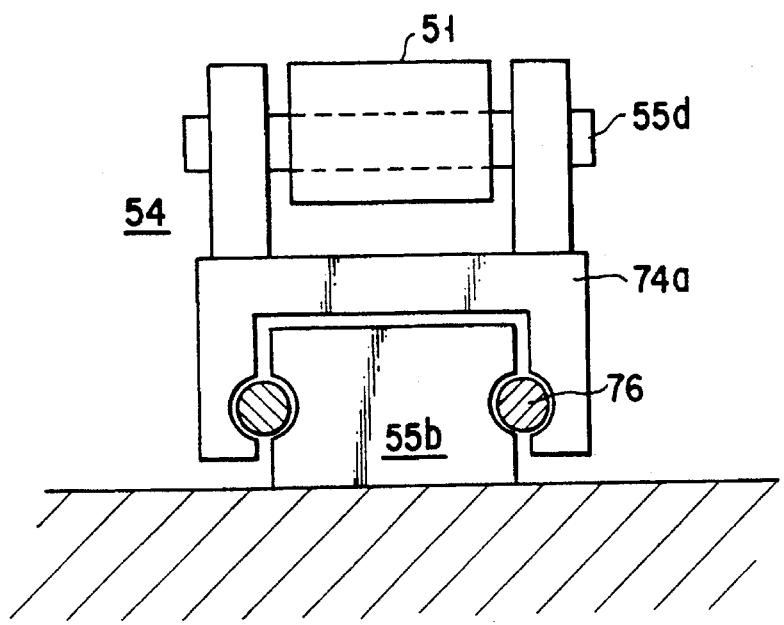
F I G. 17

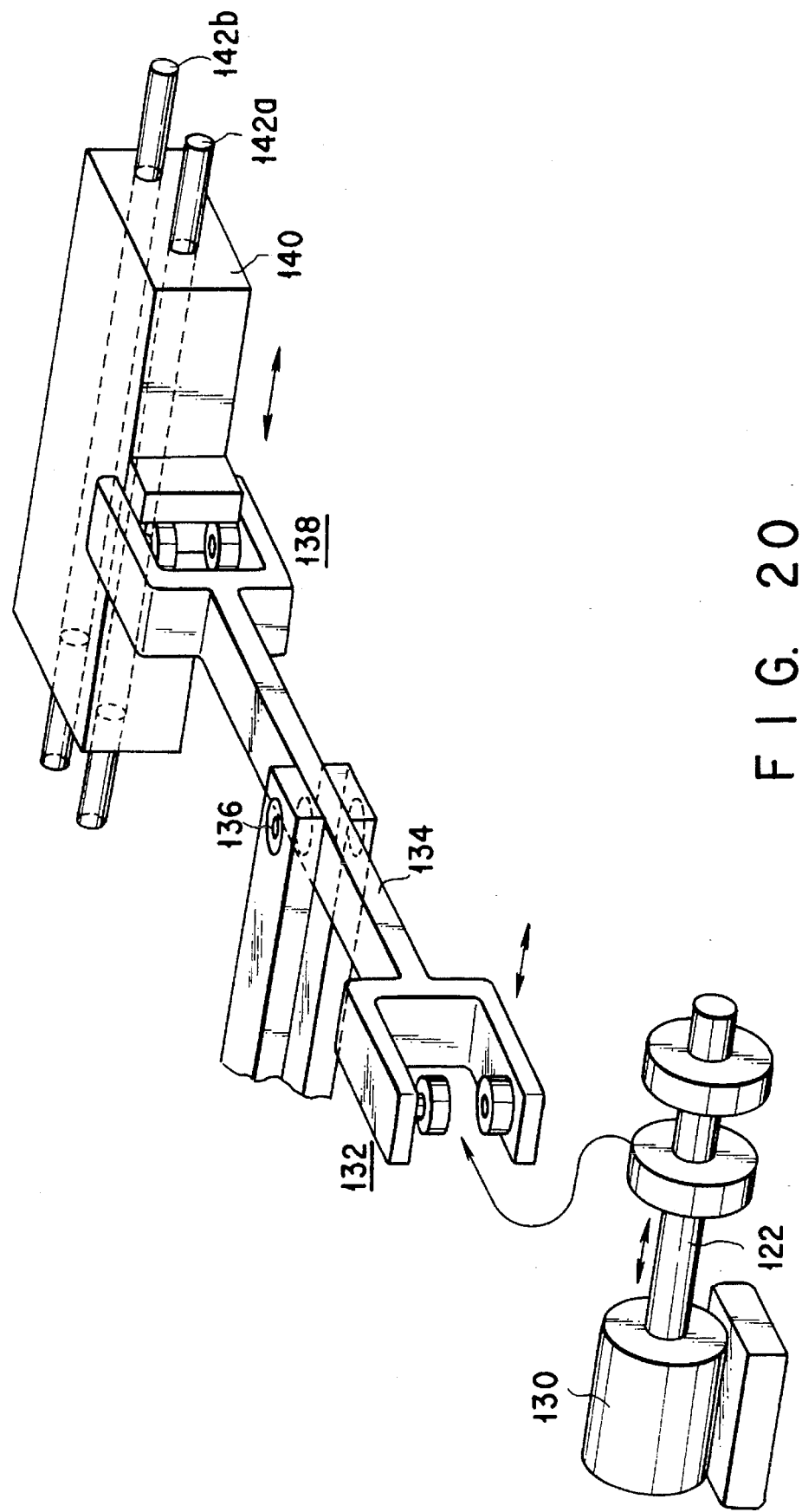
F I G. 20

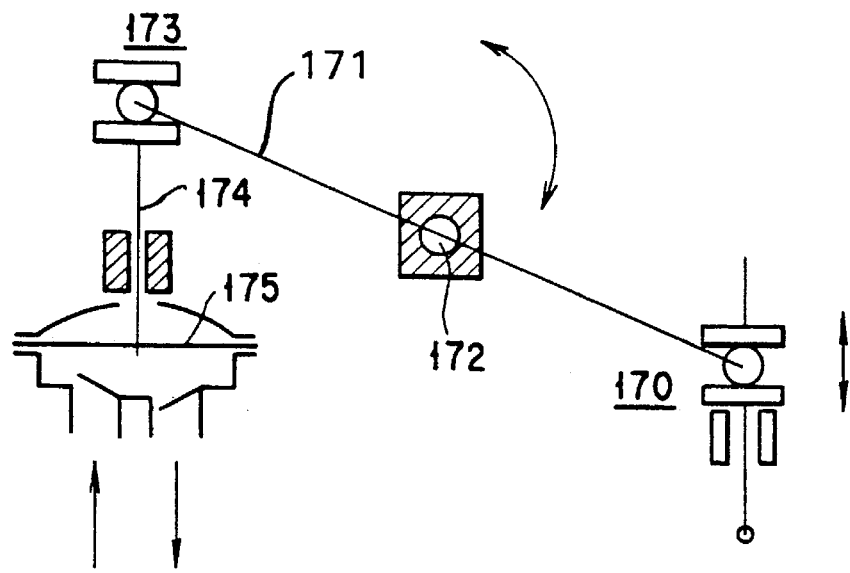
F I G. 21
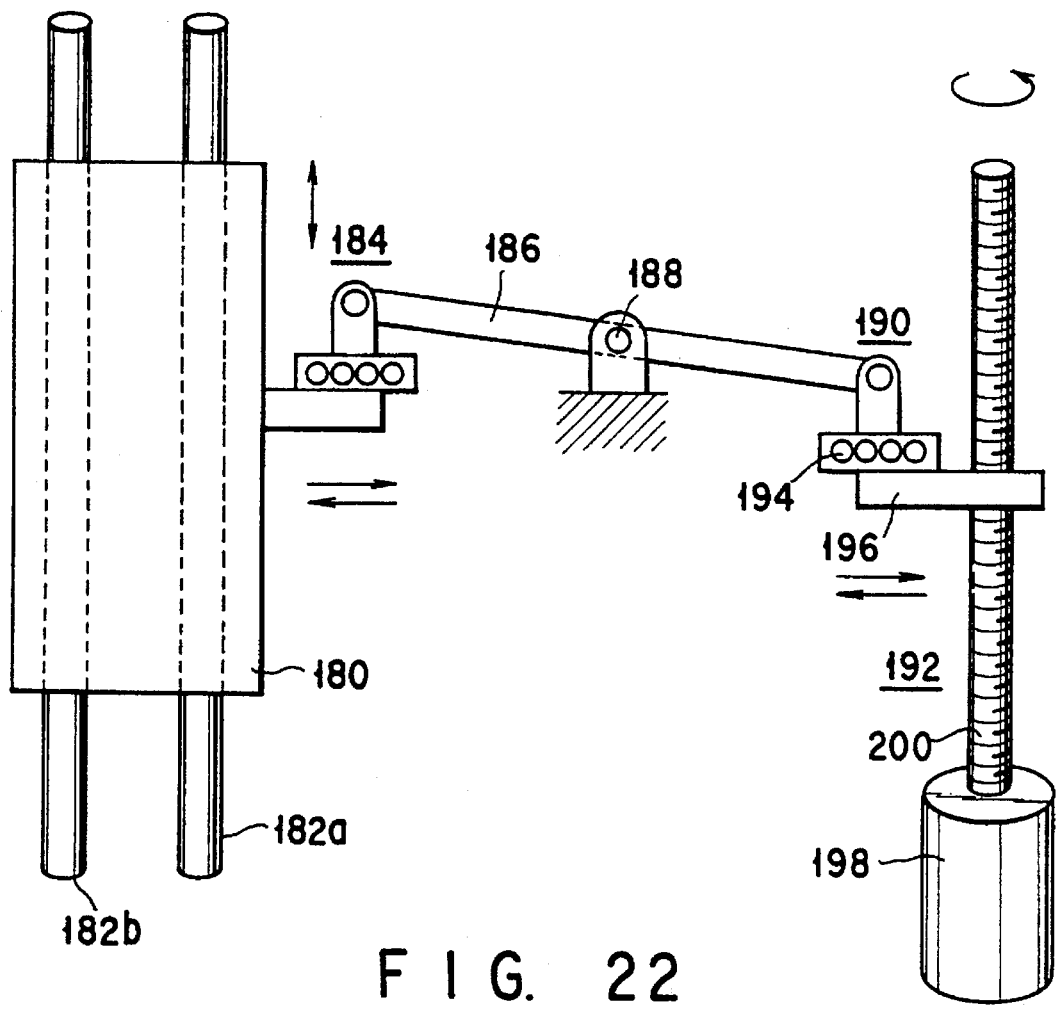
F I G. 22

LEVER APPARATUS HAVING STATIONARY FULCRUM, MOVABLE FORCE POINT AND MOVABLE ACTION POINT, AND MACHINE WHICH INCORPORATES THE SAME

TECHNICAL FIELD

The present invention relates to a lever apparatus having a stationary fulcrum, a movable force point and a movable action point, and also to a machine which incorporates the same.

BACKGROUND ART

A lever apparatus is widely used in the field of machinery, such as machine tools and industrial machines, and in the power transmission portions of moving mechanisms of structures of various types. FIGS. 1 and 2 show examples of a power transmission mechanism that utilizes the principles of a lever.

In the example shown in FIG. 1, pin links 13 and 14 are provided for the circumferential portions of a disk 12 rotatable with a stationary fulcrum as a center, such that the pin links 13 and 14 are apart from each other by 90°. The pin link 13 serving as a force point is coupled, through a coupling member 15a extending in a tangential direction of the disk 12, to one end of a driving arm 17 supported by a support shaft 16. The other end of the driving arm 17 is coupled through a driving link 18 to a driving section. The pin link 14 serving as an action point is coupled, through a coupling member 19a extending in a tangential direction of the disk 12, to the tip end of a driven section 22 of a hydraulic device 21 supported by a support shaft 20.

In the example shown in FIG. 1, the linear motion of the driving link 18 rotates the driving arm 17, and power is transmitted through the coupling member 15a to the disk 12 (i.e., a lever apparatus) and is further transmitted through the coupling member 19a to the hydraulic device 21. However, the pin links 13 and 14, respectively serving as a force point and an action point, describe an arc when the disk 12 is rotated. Thererover each of the coupling members 15a and 19a does not linearly reciprocate but swings widthwise. In other words, the linear driving force of the driving link 18 cannot be transmitted to the coupling member 19 as a linear operating force.

In the example shown in FIG. 2, where a fulcrum 23 is fixed and a force point 24 is lowered, an action point roller 25 is strained in such a manner as to bend a coupling member 19b in the indicated direction. When this type of device is used for a long time, those portions of a guide 26 which are depicted as being upper left and lower right portions with reference to a guide hole are likely to be abraded.

SUMMARY OF INVENTION

Accordingly, an object of the present invention is to provide a lever apparatus which is supported at a stationary fulcrum, which employs regulators permitting coupling members respectively connected to the force and action points to linearly reciprocate at all times, and which enables a large force to be transmitted in a desired direction with high precision, and also to provide a machine incorporating the lever apparatus.

According to the present invention, this object is achieved by employing regulators which swing and displace the force and action points of a lever apparatus without reference to the rotational position of the lever apparatus in such a manner that the arcuate loci of the force and action points are converted into linear reciprocating motions easily and accurately.

A machine incorporating the lever apparatus of the present invention (e.g., a pressing machine) comprises: a lever member which is rotatably supported by a stationary fulcrum; regulators including guide members for swinging and displacing the force and action points of the lever member; a driving mechanism, coupled to the lever member, for transmitting a driving force to the force point of the lever member; and a tool section (e.g., a pressing head) coupled to the action point of the lever member and driven in accordance with the movement of the lever member.

The inventor of the present invention developed lever apparatuses wherein a fulcrum is moved in accordance with the rotation of a lever member, and filed patent applications to seek patents for such lever apparatuses. One of the patent applications was PCT international Application No. PCT/JP90/00737 filed on Jun. 6, 1990 (now U.S. Pat. No. 5,182,967). In the lever apparatus of this International Application), the fulcrum is moved in accordance with the rotation of the lever member in such a manner that the force point and the action point can be moved with a high degree of freedom, as a result of which the force point and the action point describe linear lines. However, it is obvious that the lever apparatus will become more mechanically stable and precise and simpler in structure, if the lever member of the apparatus is supported on a stationary fulcrum. In consideration of this, the present invention employs a lever member rotatably supported on a stationary fulcrum, and further employs regulators including guide members for moving and displacing the force and action points of that lever member. Owing to the employment of these, the present invention can provide a lever member which is mechanically stable and in which the force point and the action point are permitted to move with a high degree of freedom, and can further provide a machine incorporating the lever apparatus.

BRIEF DESCRIPTION OF DRAWINGS

FIG. 11 is a diagram showing the loci described by the force and action points of the embodiment depicted in FIG. 8;

FIG. 16 is a schematic diagram showing a lever apparatus according to a further embodiment of the present invention;

FIG. 17 is a schematic diagram showing a lever apparatus according to a still further embodiment of the present invention;

FIG. 20 is a perspective view schematically showing an example in which a lever apparatus of the present invention is incorporated in a damper of a building;

FIG. 21 is a schematic view showing the case where a lever apparatus of the present invention is incorporated in a diaphragm pump;

FIG. 22 shows an embodiment wherein a lever apparatus of the present invention is incorporated in an X-Y table driving mechanism.

DETAILED DESCRIPTION

Embodiments of the present invention will now be described in detail.

Figure 1:
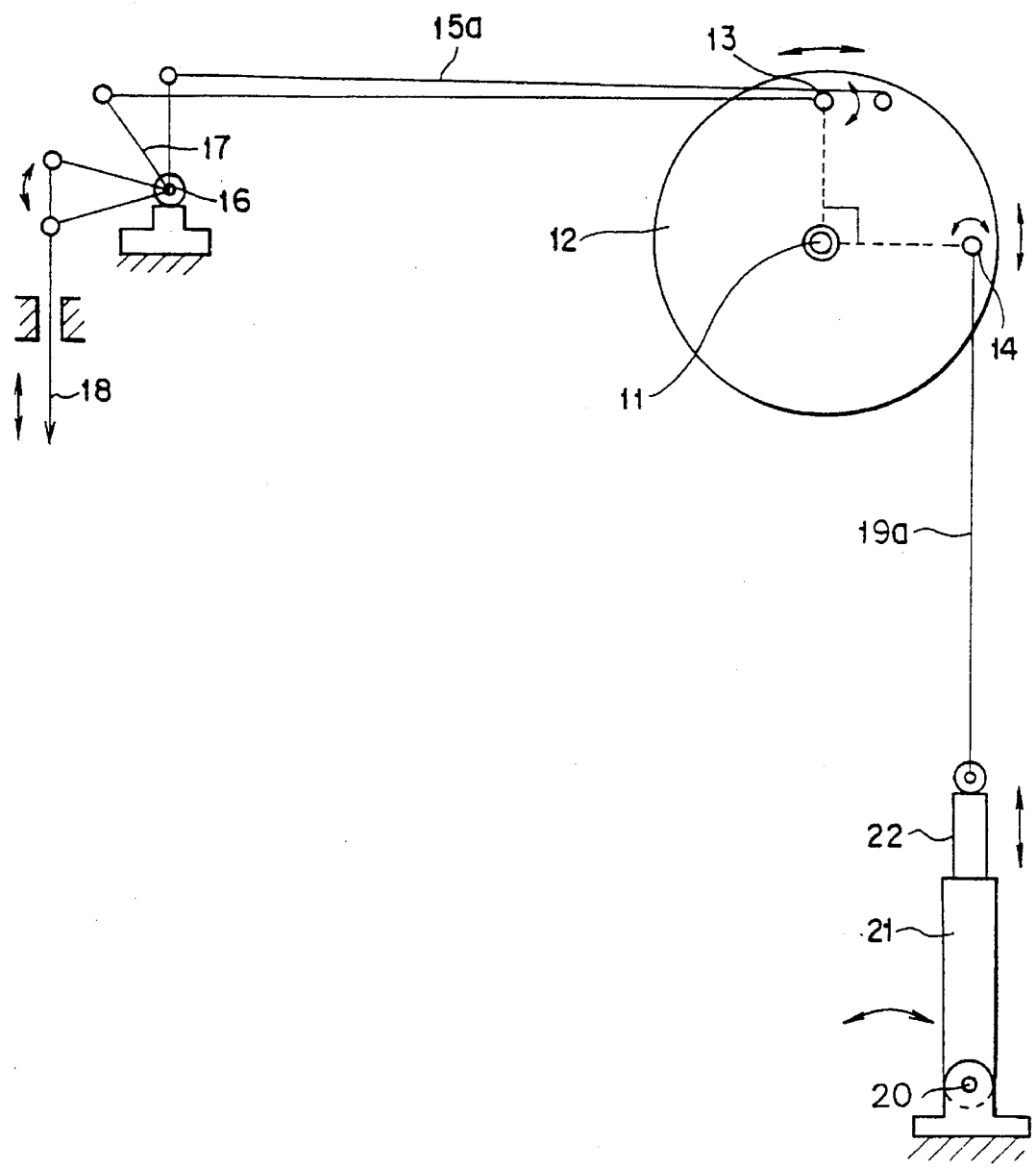
FIG. 1 is a schematic diagram showing a power transmission mechanism employing a conventional lever apparatus.
Figure 2:
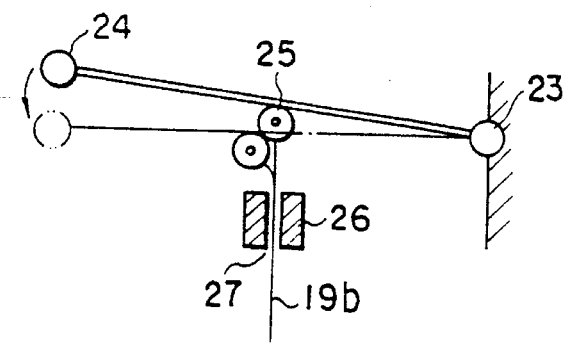
FIG. 2 is a schematic diagram showing another power transmission mechanism employing a conventional lever apparatus.
Figure 3:
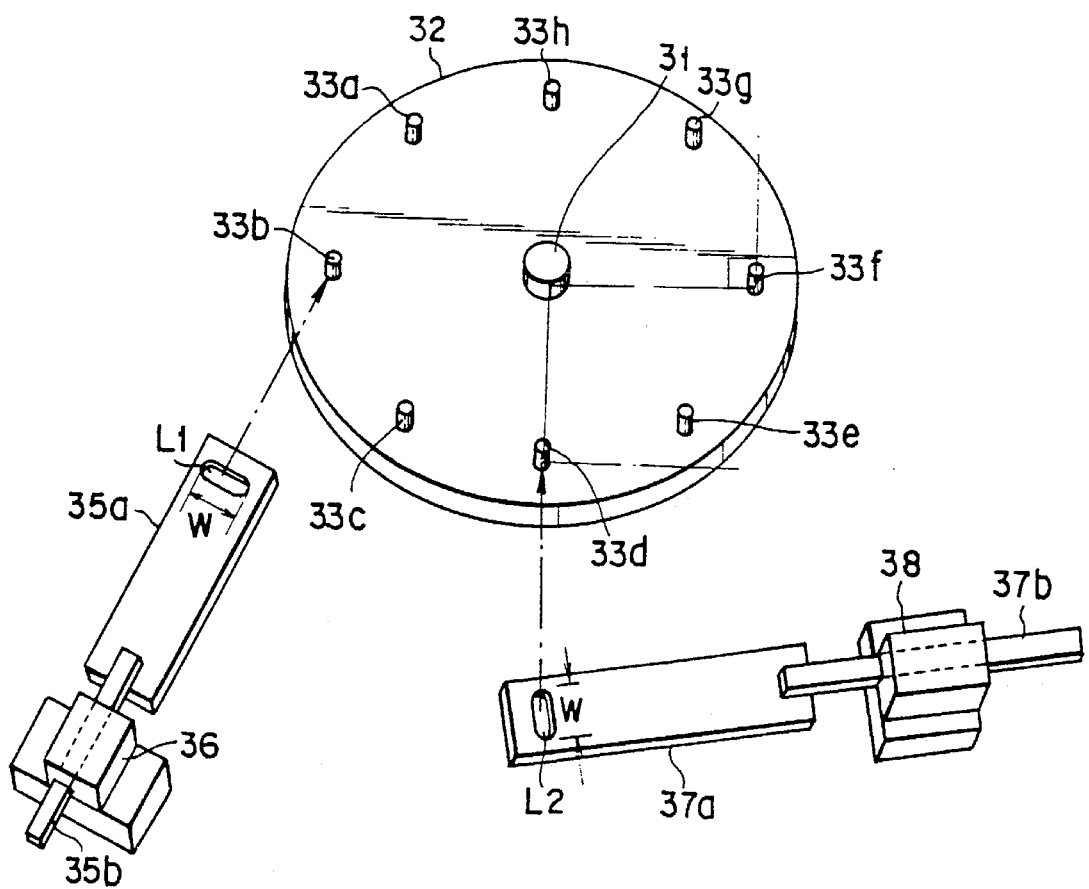
FIG. 3 is a perspective view schematically showing a lever apparatus according to one embodiment of the present invention.

Referring to FIG. 2, a plurality of pin links 33a, ... 33h are provided for the circumferential portions of a disk 32 rotatable with a stationary fulcrum 31 as a center, such that the pin links are apart from one another by predetermined angles. Of the two pin links 33b and 33d which are apart from each other by 90°, the pin link 33b serving as a force point is coupled to a driving section (not shown) through coupling members 35a and 35b extending in a tangential direction of the disk 32. Coupling member 35b is restricted in movement by a guide 36 such that it linearly moves in a circumferential direction of the disk 32. The pin link 33d serving as an action point is coupled to a driven section (not shown) through coupling members 37a and 37b extending in a tangential direction of the disk 32. Coupling member 37b is restricted in movement by a guide 38 such that it linearly moves in a circumferential direction of the disk 32. The coupling member 35a which engages with the pin link 33b serving as the force point is made to serve as a regulator by forming an elongated hole L1 therein; likewise, the coupling member 37a which engages with the pin link 33d serving as the action point is also made to serve as a regulator by forming an elongated hole L2 therein. Shafts 35b and 37b linearly reciprocate through guides 36 and 38, respectively.

The ranges of movement which can be converted by the regulators 35a and 37a are determined by the lengths W of the elongated holes L1 and L2. It should be noted that the central axes extending in the length (W) direction of the elongated holes L1 and L2 of the coupling members 35a and 37a (which are regulators for the force and action points, respectively) must be perpendicular to the shafts 35b and 37b, so as to enable power to be transmitted without any loss with this structure, the linear movement of the shaft 35b connected to the force point is converted into the linear movement of the shaft 37b connected to the action point with high efficiency. When the distance between pin link 33b and the stationary fulcrum 31 and the distance between pin link 33d and the stationary fulcrum 31 are equal to each other, the power transmission ratio is 1:1. Needless to say, the power transmission ratio can be arbitrarily determined by changing these distances.

Figure 4:
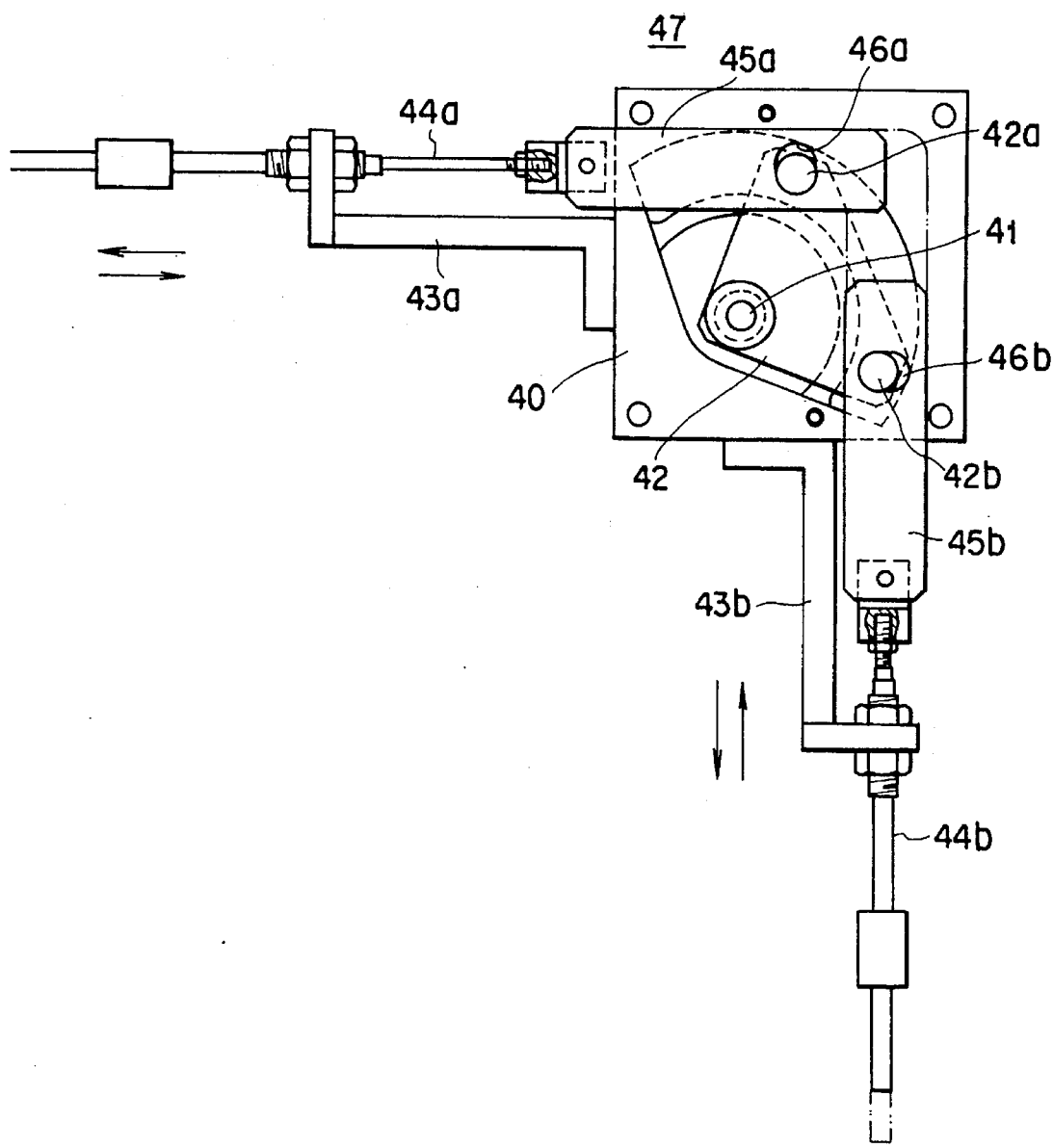
FIG. 4 is a diagram showing a modification of the embodiment depicted in FIG. 3.

FIG. 4 shows a power transmission mechanism of 90° angle type, wherein the power transmission ratio is 1:1. Referring to FIG. 4, a lever arm 42 is rotatable about a fulcrum 41, which is secured to a housing 40 attached to a frame (not shown). The lever arm 42 is substantially in the shape of a right-angled triangle and has two pins 42a and 42b. The two pins 42a and 42b are apart from each other by 90° and located away from the fulcrum 41 by the same distance. Support plates 43a and 43b are attached to the housing 40. The support plates 43a and 43b hold input/output shafts 44a and 44b in such a manner that the input/output shafts 44a and 44b can freely move in tangential directions of the circle described by the pins 42a and 42b. Coupling members 45a and 45b are coupled, at one end, to the distal ends of the shafts 44a and 44b. Elongated holes 46a and 46b are formed at the other ends of the coupling members 45a and 45b, and the pins 42a and 42b engage with the elongated holes 46a and 46b, respectively. In this manner, a power transmission mechanism 47 employing a lever apparatus of the present invention is obtained.

Referring to FIG. 4, when input/output shaft 44b is applied with a force acting in the direction which is "upward" in the FIGURE, the lever arm 42 is rotated counterclockwise, and input/output shaft 44a is linearly moved in the direction perpendicular to input/output shaft 44b. In this case, the pin 42b to which the force is input serves as a force point, while the pin 42a from which the force is output serves as an action point. It should be noted that the power transmission mechanism 47 shown in FIG. 4 is a reversible type, and pin 42a and pin 42b may be made to serve as force and action points, respectively.

Figure 5:
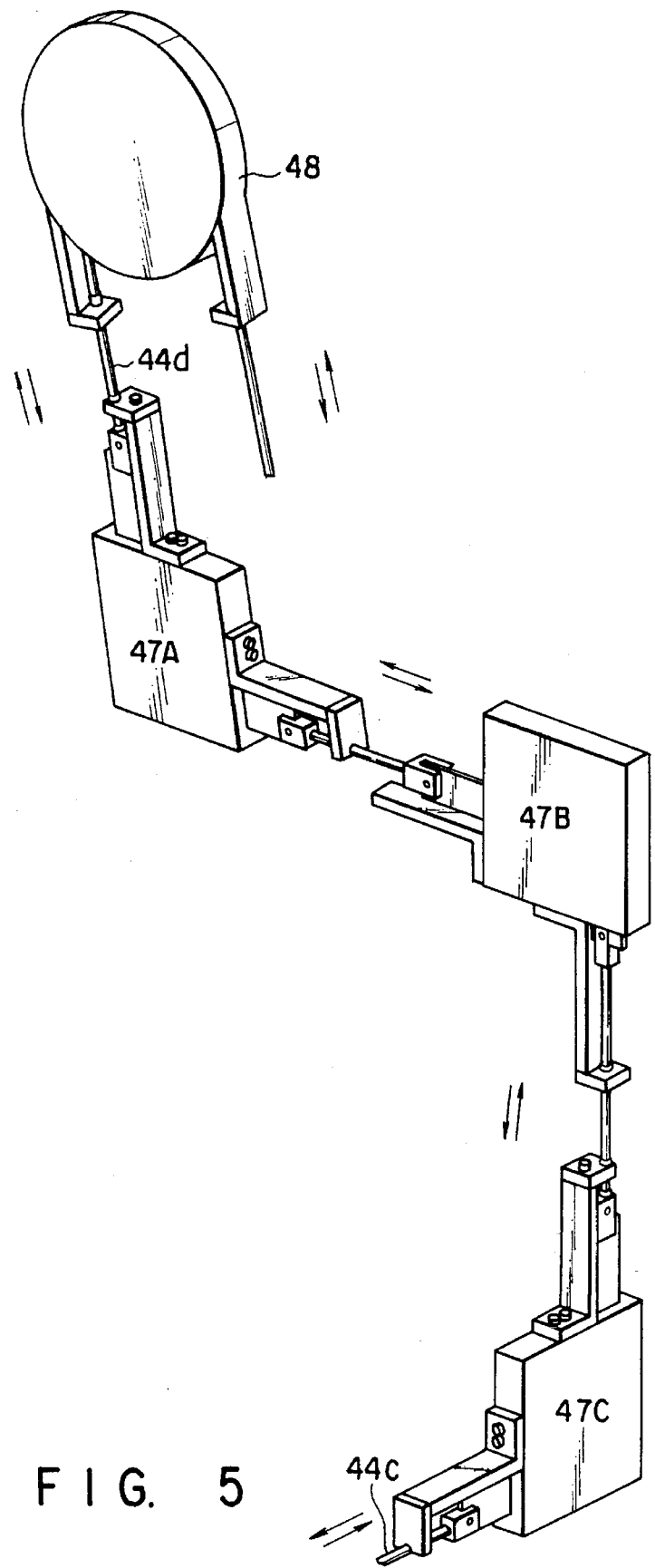
FIG. 5 shows an example of a three-dimensional power transmission mechanism using the embodiment depicted in FIG. 4.

FIG. 5 shows an example of a three-dimensional power transmission system employing a number of power transmission mechanisms depicted in FIG. 4. In the example shown in FIG. 5, three power transmission mechanisms 47A, 47B and 47C are arranged three-dimensionally on a frame (not shown), and a force can be transmitted in any of the three-dimensional directions. Since the power transmission loss in each of the power transmission mechanisms is substantially zero, the force applied to an input shaft 44c can be transmitted to an output shaft 44d without being damped, and is then exerted on a driven section 48.

In the embodiment shown in FIG. 4, the coupling members 49a and 45b, having elongated holes 46a and 46b with which pins 42a and 42b are in engagement, are employed as a force point regulator and an action point regulator, respectively. However, the present invention is not limited to this, and various means can be employed as the force point regulator and action point regulator.

FIGS. 6 through 9 show other embodiments of the present invention.

In FIGS. 6 through 9, reference numeral 51 denotes a lever member, reference numeral 52 denotes a fulcrum member for fixedly supporting the lever member 51, reference numeral 53 denotes a fulcrum support member for supporting the fulcrum member 52, reference numeral 54 denotes a force point regulator which is coupled to a force point (i.e., one end of the levee member 51) in such a manner that the force point regulator is rotatable and displaceable, and reference numeral 56 denotes an action point regulator which is coupled to an action point (i.e., the other end of the lever member 51) in such a manner that the action point regulator is rotatable. The coupling portion for coupling the force point regulator 54 to the lever member 51 is preferably a known cam follower type comprising a roller that rolls between a pair of guide plates 55a and 55b.

The embodiments shown in FIGS. 6 through 9 are of a type wherein the force point regulator 54 and the action point regulator 56 are linearly movable in the vertical direction along the grooves of guide frames 58. The action point regulator 56 has a similar structure, and a roller 56c is supported between a pair of guide members 56a and 56b such that it is linearly rollable in the horizontal direction.

Figure 6:
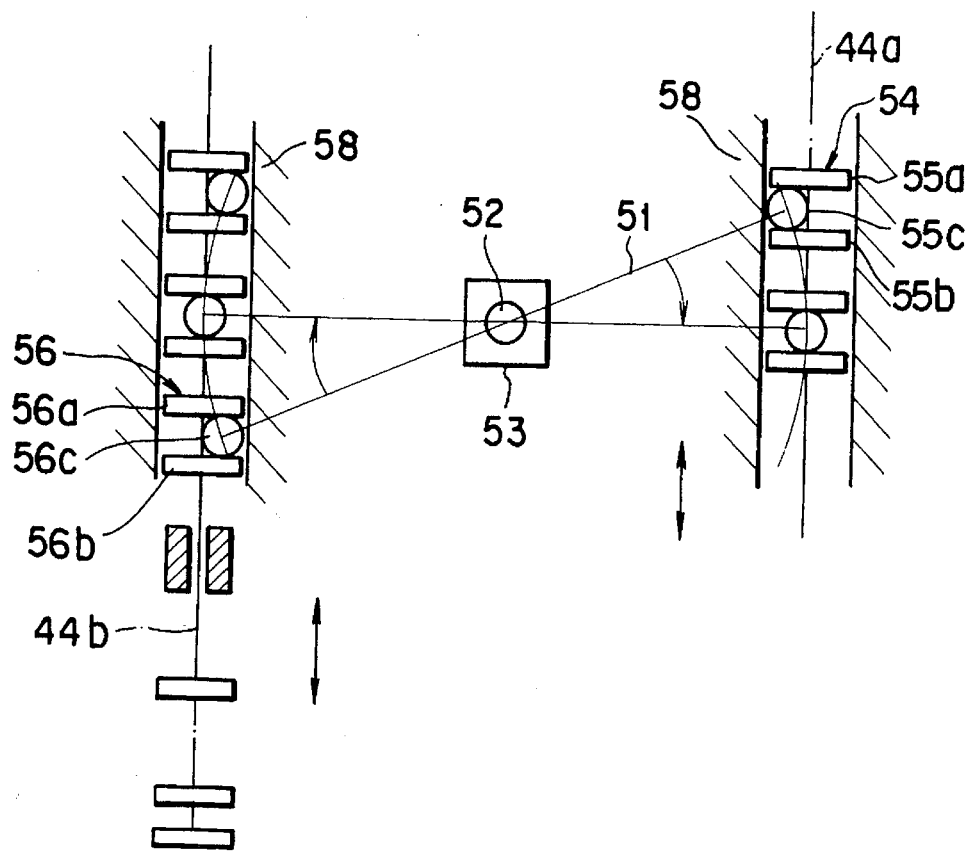
FIG. 6 is a schematic view showing a lever apparatus according to another embodiment of the present invention.
Figure 7:
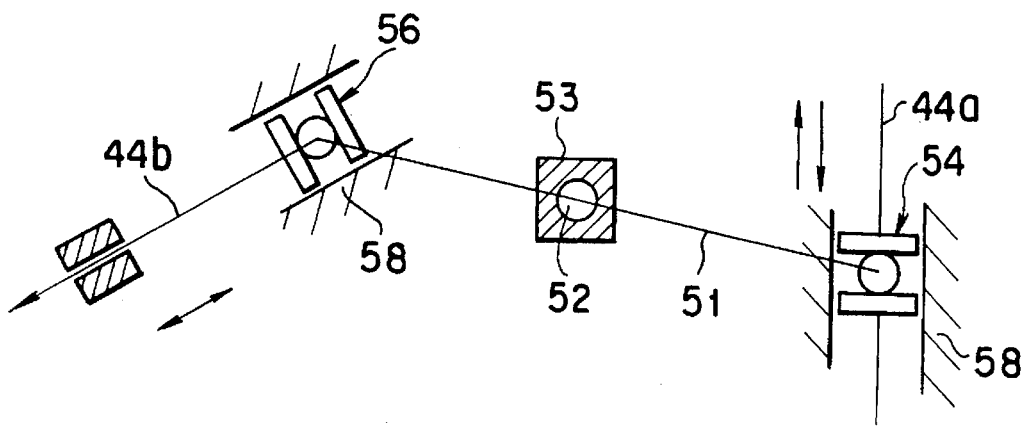
FIG. 7 is a diagram schematically showing a lever apparatus according to still another embodiment of the present invention.

The embodiments shown in FIGS. 6 and 7 are of an intermediate fulcrum structure wherein the fulcrum member 52 is located between the force point 54 and action point 56 of the lever member 51. In the embodiment shown in FIG. 6, the action point regulator 56 operates such that the input/output shafts 44a and 44b are linearly moved in the vertical direction. When the force point regulator 54 is driven in the vertical direction, the lever member 51 swings, with the fulcrum member 52 as a center. Since the fulcrum member 52 of the lever member 51 is stationary, the rollers 55c and 56c move along the guide members 55a, 55b, 56a and 56b and describe arcuate loci, when the lever member 51 swings. However, the force point regulator 54 and action point regulator 56 move linearly in the vertical direction. In the case of the embodiment shown in FIG. 7, the action point regulator 56 is linearly moved in a slanted direction.

Figure 10:
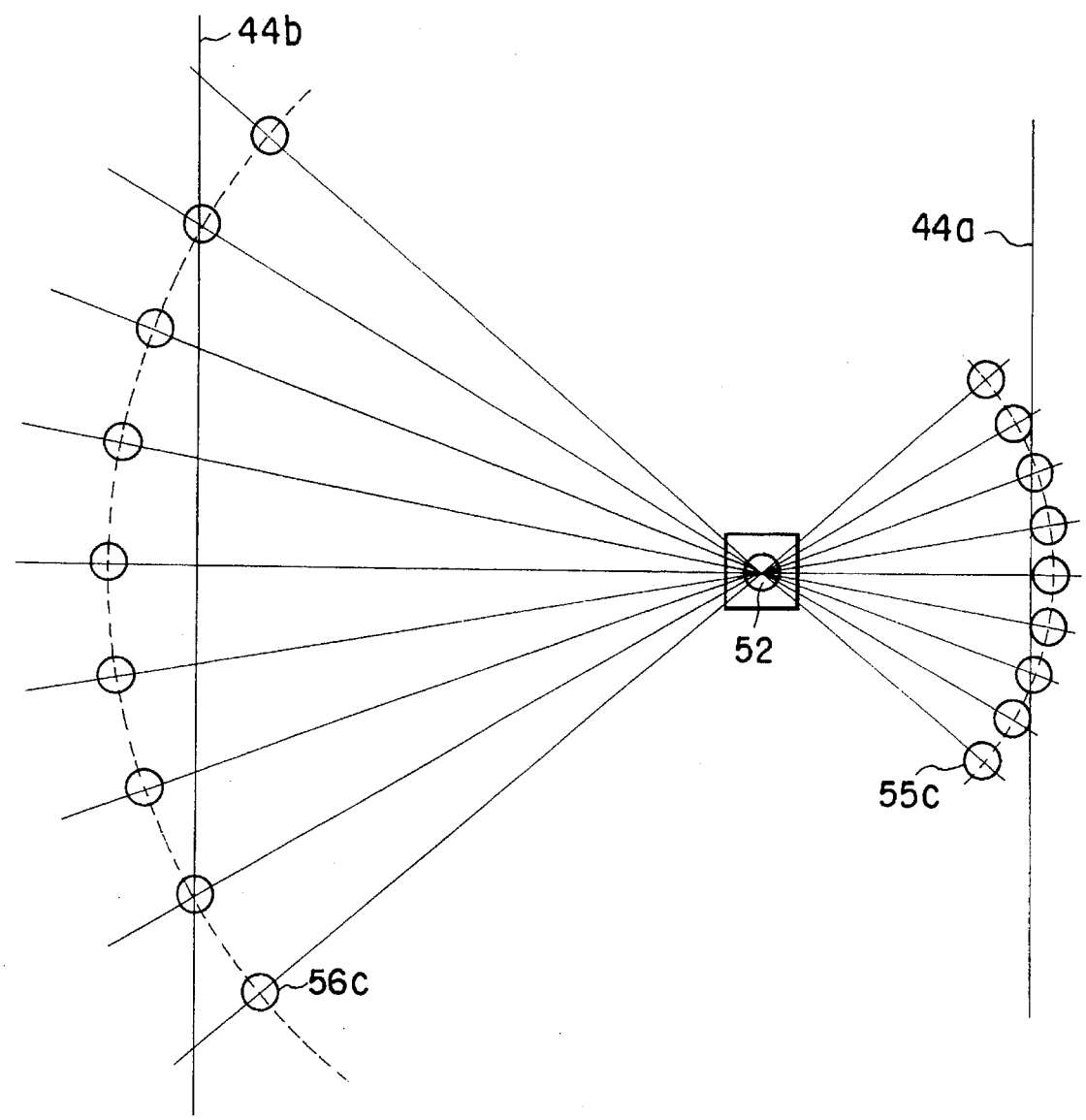
FIG. 10 is a diagram showing the loci described by the force and action points of the embodiment depicted in FIG. 6.

In this manner, the force point and action point of the lever apparatus depicted in FIG. 6 can describe linear loci, as indicated in FIG. 10.

Figure 8:
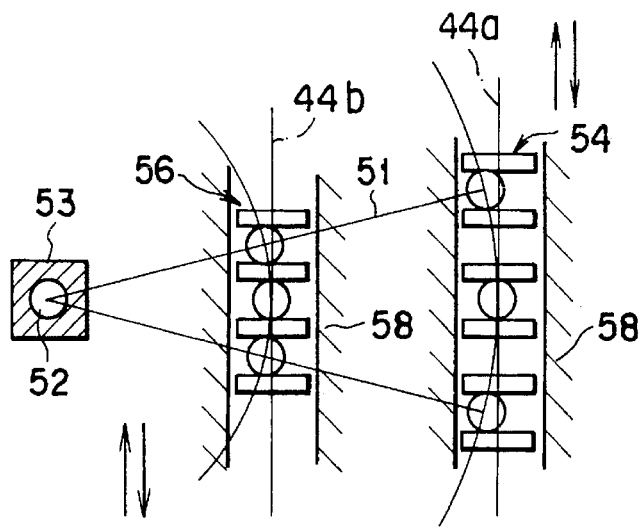
FIG. 8 is a diagram schematically showing a lever apparatus according to a further embodiment of the present invention.

The embodiment shown in FIG. 8 is of an outer fulcrum structure wherein a stationary fulcrum member 52 and a force point regulator 54 are located at the opposite ends of a lever member 51 and wherein an action point regulator 56 is located at an intermediate point of the lever member 51. In this case, the stroke of the action point is shorter than that of the force point, but an increased force is exerted at the action point.

Figure 9:
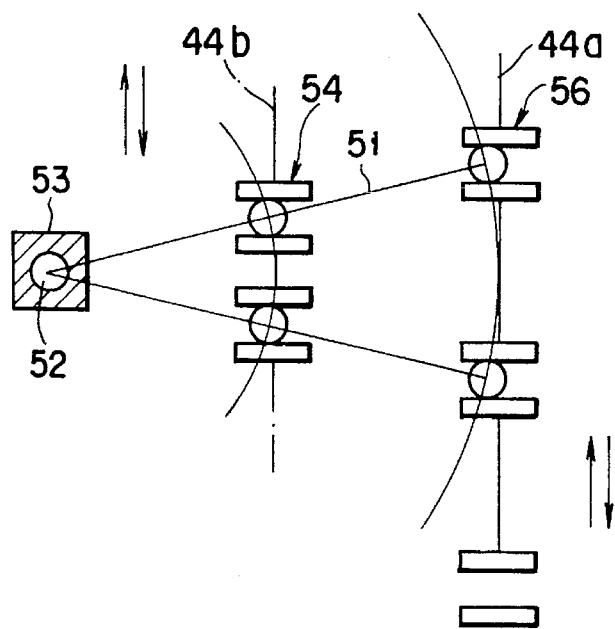
FIG. 9 is a diagram schematically showing a lever apparatus according to a further embodiment of the present invention.

In the embodiment shown in FIG. 9, a stationary fulcrum member 52 and an action point regulator 56 are located at the opposite ends of a lever member 51, and a force-application regulator 54 is located at an intermediate point of the lever member 51. In this case, the stroke of the action point is longer than that of the force point, but a decreased force is exerted at the action point.

According to these embodiments, when the lever member 51 swings, the rollers 55c and 56c freely move between the guide plates in accordance with the movements of the force point regulator 54 and the action point regulator 56. Therefore, the force point regulator 54 and the action point regulator 56 have high degrees of freedom when they move. In addition, the rollers 55c and 56c of the action point regulator 56 and force point regulator 54 can move to their optimal positions. Accordingly, a driving force can be efficiently transmitted from the force point regulator 54 to the action point regulator 56 through the lever member 51, with the action point regulator 56 being permitted to move in various ways.

The movement of the force point regulator 54 and the movement of the action point regulator 56 may be any combination of a vertically linear movement, a horizontally linear movement and a slantwise linear movement.

The lever apparatuses of movable force and action points type, which have structures described above, have a wide range of application; they can be employed in machine tools (such as a pressing machine) and industrial machines, and in the movable portions of structures of various types.

In the lever apparatus shown in FIG. 6, the force point and the action point are made movable by permitting the rollers 55c and 56c of the force point regulator 54 and action point regulator 56 to roll between the guide plates 55a, 55b, 56a and 56b.

Figure 12:
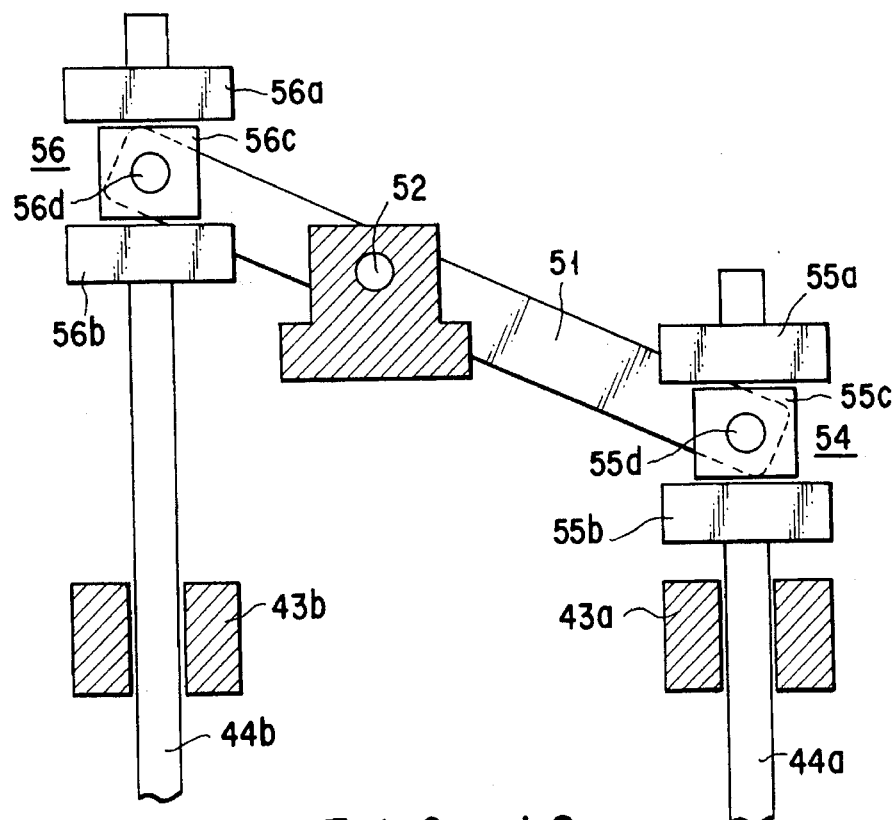
FIG. 12 is a schematic diagram showing a lever apparatus according to still another embodiment of the present invention.
Figure 13:
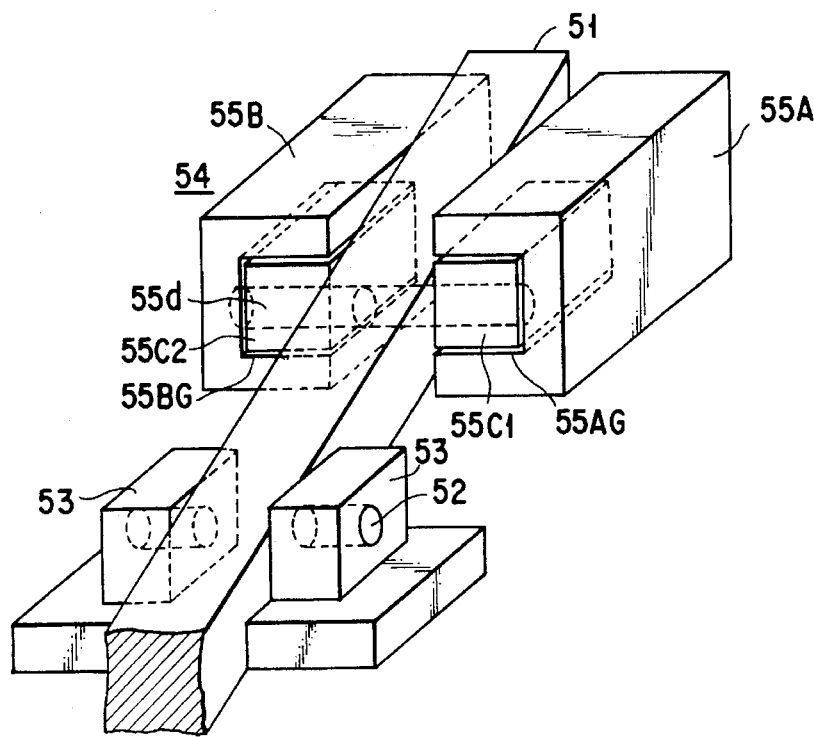
FIG. 13 is a schematic diagram showing a lever apparatus according to a further embodiment of the present invention.

In the examples shown in FIGS. 12 and 13, no roller is employed. Instead, sliding members 55c and 56c, which are inserted between the guide members 55a, 55b, 56a and 56b of a movable force point regulator 54 and a movable action point regulator 56, have holes, and the force point and action point of a lever member 51 are movably coupled together by means of shafts 55d and 56d inserted into the holes of the sliding members 55c and 56c. In the example shown in FIG. 13, sliding members 55C1 and 55C2, which are inserted in the guide grooves 55AG and 55BG of guide members 55A and 55B, have holes, and one end of a lever member 51 is movably coupled by means of a shaft 55d inserted into the holes of the sliding members 55C1 and 55C2.

The force point regulator 54 and the action point regulator 56 are respectively connected to coupling members 44a and 44b, and members 44a and 44b are respectively inserted in guide plates 43a and 43b secured to the ground, such that they move linearly. In the examples, the outer surfaces of the sliding members 55c, 56c, 55C1 and 55C2 are worked with high precision, and the inner surfaces of guide plates 55a, 55b, 56a, 56b, 55A and 55B are worked to be smooth. By this working, no large friction is produced, and the examples can be put to practice without causing any particular problem. In the example shown in FIG. 12, in particular, the forces applied to the shafts 44a and 44b are transmitted at right angles at all times, so that the torsion stress occurring in the case depicted in FIG. 2 is not produced in the examples.

Figure 14:
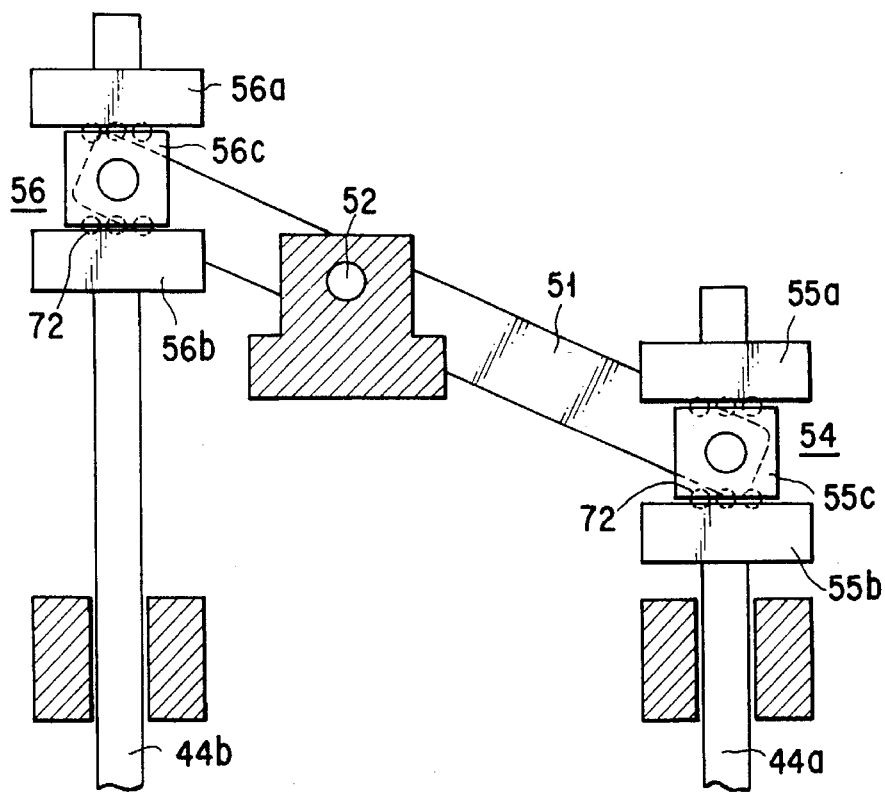
FIG. 14 is a schematic diagram showing a lever apparatus according to a still further embodiment of the present invention.
Figure 15:
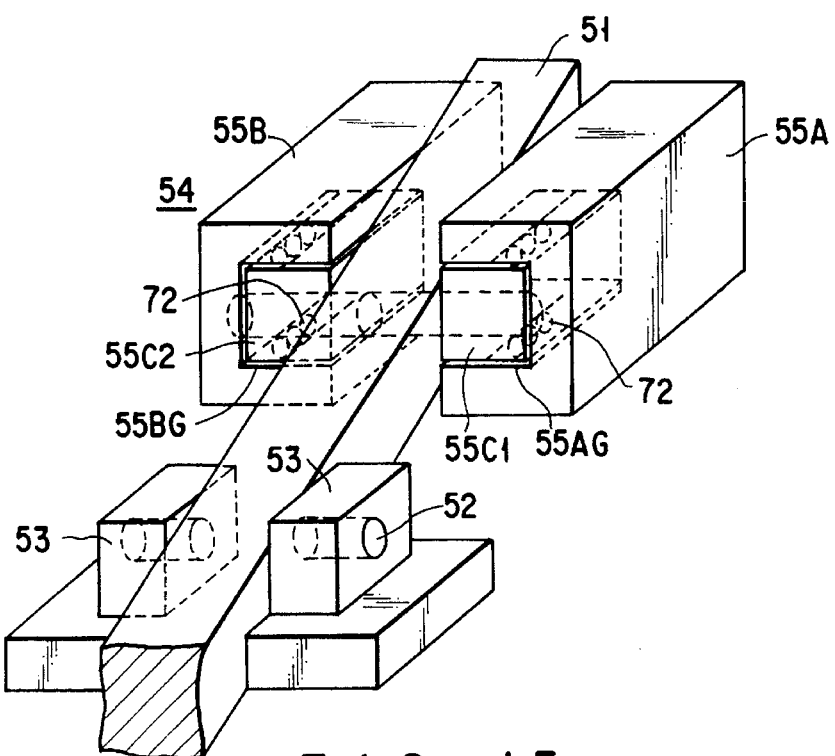
FIG. 15 is a schematic diagram showing a lever apparatus according to another embodiment of the present invention.

In order to permit the sliding members 55c, 56c, 55C1 and 55C2 to move further smoothly, a number of ball bearings may be inserted between the guide plates 55a, 55b, 56a and 56b and the sliding members 55c and 56c, and also in the upper and lower gaps between the guide grooves 55AG and 55BG and the sliding members 55C1 and 55C2, as shown in FIGS. 14 and 15. Rollers may be employed in place of the ball bearings.

FIGS. 16 and 17 each show other examples of a movable force and action points structure. In the example shown in FIG. 16, shafts 55d and 56d are attached to regulator support members 74a and 74b, respectively, and a lever member 51 is swingably supported on a stationary fulcrum shaft 52. The support members 74a and 74b are inserted into bearing grooves formed in the upper portions of the guide plates 55b and 56b, and are permitted to move in the directions indicated by the arrows, due to a number of ball bearings 75 provided between the support members 74a and 74b and the guide plates 55b and 56b.

In the example shown in FIG. 17, the force point of the lever member 51 is movably supported by the regulator shaft 55d, and the support member 74a is placed on the guide plate 55b, with linear rails 76 located therebetween. A movable force point is obtained by supporting one end of the lever member 51 on the support member 74a in such a manner as to be movable in the direction in which the rails extend.

Figure 18:
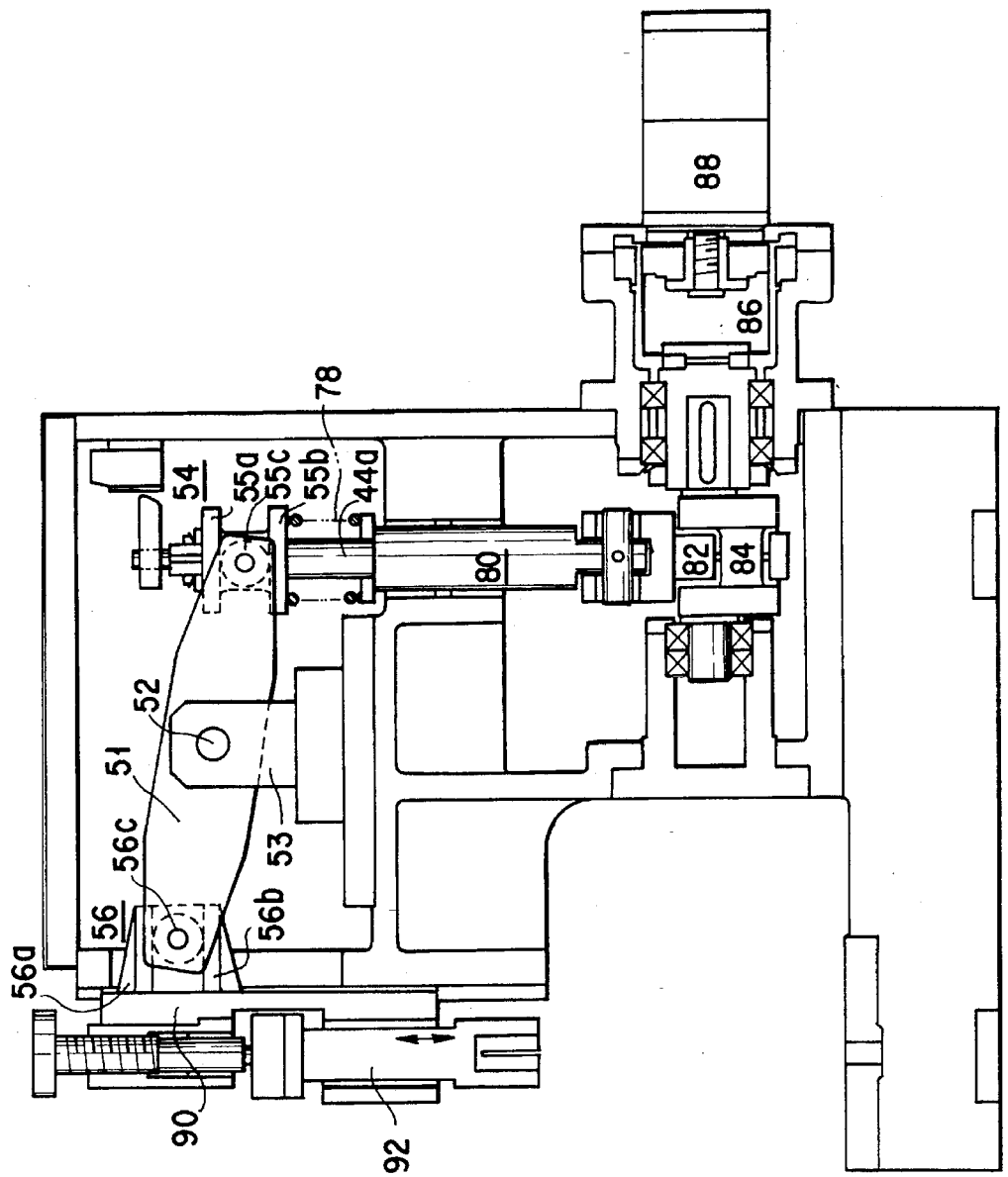
FIG. 18 shows a pressing machine incorporating a lever apparatus of the present invention.

FIG. 18 shows a pressing machine which incorporates the lever apparatus depicted in FIG. 6 and which comprises a movable force point and a movable action point. In the pressing machine shown in FIG. 18, a lever member 51 is movably supported by a fulcrum shaft 52 provided for a fulcrum member 53.

One end of the lever member 51 is coupled to a vertical driving shaft 80 through a force point regulator 54. The lower end of the vertical driving shaft 80 is coupled to an eccentric shaft 84 through a crank mechanism 82, and is driven in the vertical direction in accordance with the rotation of the eccentric shaft 84. One end of the eccentric shaft 84 is coupled to an electric motor 88 through a power transmission mechanism 86 (e.g., a gear mechanism), and is rotated by the electric motor 88.

The other end of the lever member 51 is coupled to an elevator 90 through an action point regulator 56. The head 92 attached to the elevator 90 is driven in the vertical direction, as indicated by the arrow. In the case of this embodiment, the torque of the electric motor 88 is transmitted to the lever apparatus via each link mechanism, and it is not necessary to employ a flywheel or the like, such as that required in the conventional art. Accordingly, the machine is small in size, and the lever apparatus incorporated therein and comprising a movable force point and a movable action point enables power to be smoothly transmitted to the head 92.

Figure 19:
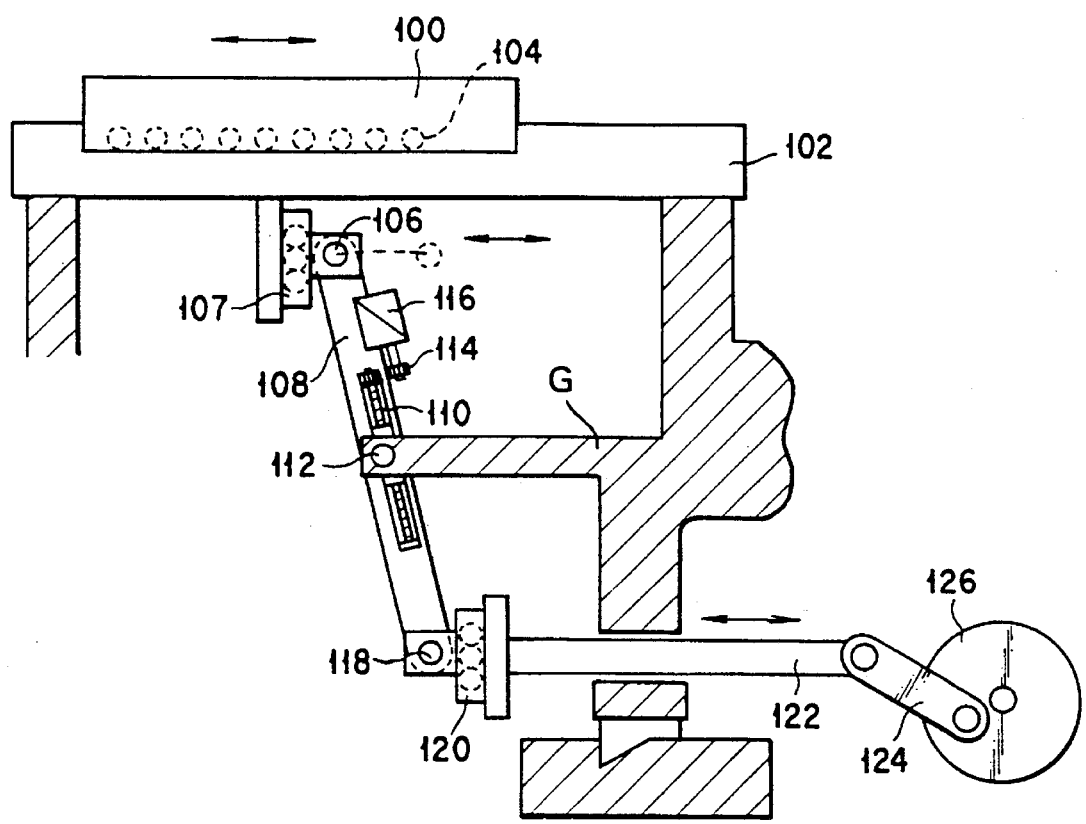
FIG. 19 shows a surface grinding machine incorporating a lever apparatus of the present invention.

FIG. 19 shows an example illustrating how the present invention is applied to a surface grinding machine wherein the strokes of movable force and action points are adjustable by a movable fulcrum.

Referring to FIG. 19, a bed 100 is supported on a support member 102, with bearings 104 interposed, such that the bed 100 can smoothly move on the support member 102 in a horizontal plane. The lower portion of the bed 100 is supported by one end of a lever member 108 by means of both a shaft 106 (which serves as an action point) and a linearly movable bearing mechanism 107. The lever member 108 is coupled to a fulcrum member 112 which is in engagement with a screw rod 110. The fulcrum member 112 is rotatably supported on the ground G. The screw rod 110 is coupled through a gear device 114 to the rotating shaft of a motor 116 attached to the lever member 108.

The other end of the lever member 108 is coupled to a linearly movable bearing mechanism 120 through a shaft 118 (which serves as a force point). The linearly movable bearing mechanism 120 is coupled to a servo motor 126 through both a crank shaft 122 and a crank mechanism 124.

In the structure mentioned above, the torque of the servo motor 126 is converted into a linear movement by means of the crank mechanisms 122 and 124, and the linear movement is transmitted to the shaft 118 (the force point). Due to the movable force point 118 and the movable action point 106, the lever member 108 swings, with the fulcrum member 112 as a center, and the bed 100 is smoothly moved in the horizontal direction.

When the motor 116 is turned on, the screw rod 110 is rotated by the gear device 114, and the position of the fulcrum 112 is moved. Since the distance between the fulcrum 112 and shaft 106 and the distance between the fulcrum 112 and shaft 118 are changed, the moving stroke of the bed 100 is changed, accordingly.

FIG. 20 shows an embodiment wherein a lever apparatus of the present invention is applied to a damper of a building. A crank shaft 122 similar to that employed in the example depicted in FIG. 19 is coupled to a crank mechanism and a servo motor (neither is shown) through a shaft support member 130. One end of a lever member 134 (i.e., the end serving as a force portion) is coupled to one end of the crank shaft 122 through a cam follower mechanism 132 (which serves as a force point regulator). A stationary fulcrum 136 is located at the central point of the lever member 134, and the other end of the lever member 134 (i.e., the end serving as an action point regulator) is coupled to a damper block 140 through a cam follower mechanism 138. The damper block 140 is movably supported on linear rails 142a and 142b. The linear rails 142a and 142b are installed, for example, on a story which is substantially the vertical center of a multistory building and at such a position as would shake most intensely at the time of an earthquake.

In general, the vibration of an earthquake is several cycles per second, and it is easy to move the damper block 140 at a speed on this order. In the conventional art, the damper block 140 is moved by a feed screw type mechanism, so that it cannot be moved at high speed in response to the earthquake. In addition, since the block 140 is considerably heavy, the feed screw does not have a sufficient mechanical strength. Therefore, the conventional art does not ensure a satisfactory damping effect. In this embodiment, the lever apparatus and the linear rails 142a and 142b are combined, and the combination has brought about a very satisfactory result.

FIG. 21 shows an example in which a lever apparatus of the present invention is incorporated in the driving mechanism of a diaphragm pump. Referring to FIG. 21, a lever member 171 is applied with torque in the direction indicated by the arrow from a force point regulator 170 of cam follower type. Upon application of the torque, the lever member 171 swings, with a stationary fulcrum 172 as a center, and the diaphragm 175 of the diaphragm pump is vertically driven by means of a coupling member 174 connected to an action point regulator 173.

FIG. 22 shows an example of an X-Y table incorporating a movable force and action points type lever apparatus of the present invention. In this example, a table 180 is designed to move in the X direction along rails 182a and 182b. Since the table 180 can be moved in the Y direction in a similar manner, the mechanism for movement in this direction is omitted. The table 180 is pivotally supported by one end of a lever member 186 by means of an action point regulator 184. At the other end of the lever member 186, rollers 194, which are contained in a regulator 190 and serve as the force point of a ball screw rotation feed mechanism 192, are provided, with a stationary fulcrum 188 and an action point regulator 190 being located between the rollers 194 and the action point regulator 184. A guide member 196 is in threadable engagement with a ball screw 200 driven by a motor 198.

Figure 23:
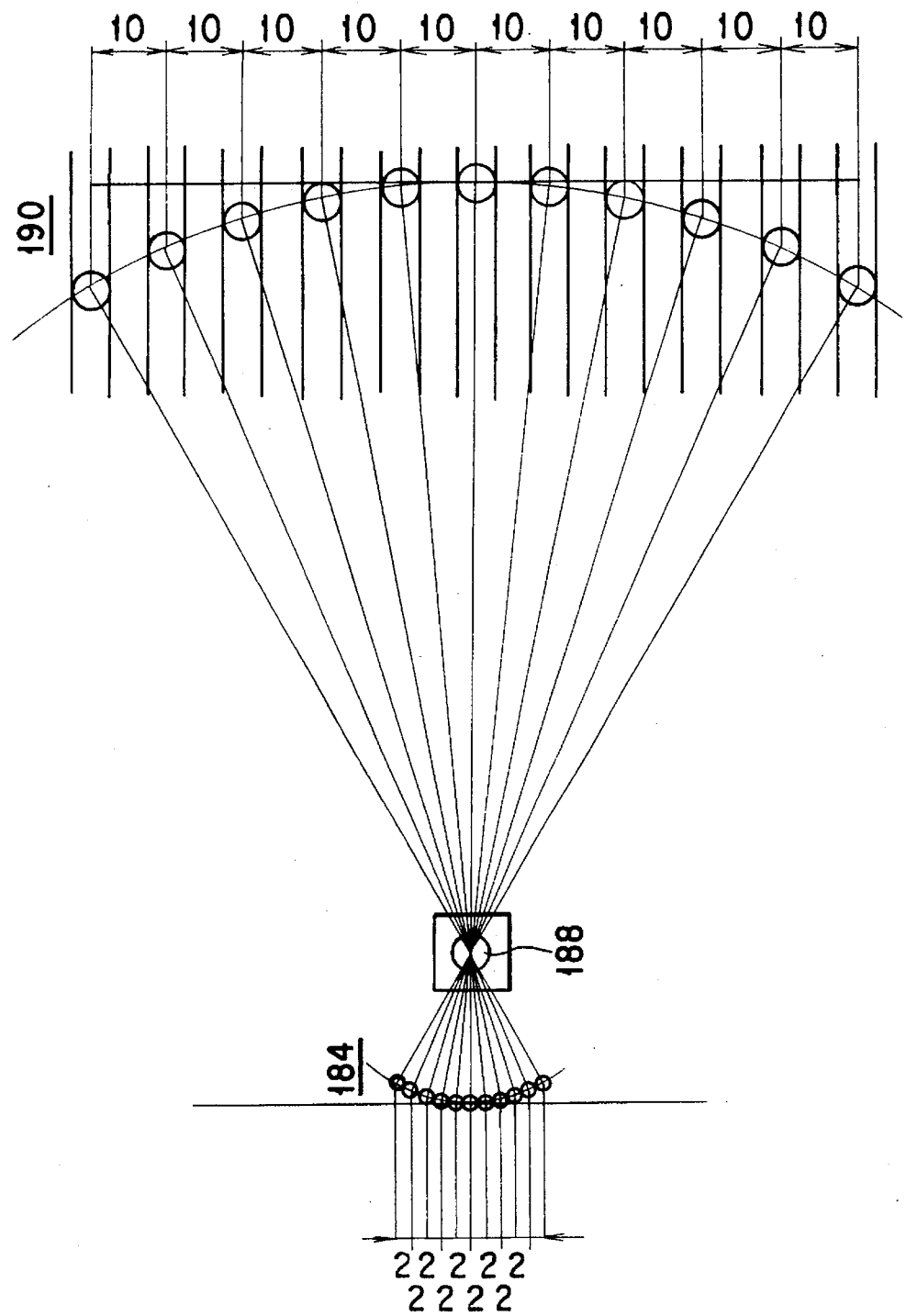
FIG. 23 is a diagram showing the loci described by the major portions of the structure depicted in FIG. 22.

FIG. 23 shows the loci of the major portions of the structure depicted in FIG. 22. When the ball screw 200 is fed, for example, in units of 10 μm, the action point regulator 180 is moved (i.e., the table 180 is moved) in units of 2 μm. The rollers 194 serving as the force point roll on the guide member 196 while describing an arcuate locus. When the bolt screw 200 is fed by 80 μm, the action point regulator 184 moves for a distance of 16 μm (=80/5).

Where the X-Y table has such a structure as mentioned above, the table 180 can be driven with very considerably high accuracy. Therefore, the X-Y table can be employed, for example, in an exposure device for semiconductor wafers.

I claim:

1. A lever apparatus comprising:

a lever member having a fixed fulcrum, a moving force point and an action point;

means for rotatably supporting said fixed fulcrum at a stationary point;

a force point regulator including a roller rotatably mounted at said force point, and a pair of guide plates for rollably supporting the roller therebetween;

first means for linearly moving the pair of guide plates of said force point regulator while guiding the roller in the pair of guide plates along a rotation locus of said force point about said fixed fulcrum;

an action point regulator including a roller rotatably mounted at said action point, and a pair of guide plates for rollably supporting the roller of said action point regulator therebetween; and second means for linearly moving the pair of guide plates of said action point regulator while guiding the roller of the action point regulator in the guide plates of the action point regulator along a rotation locus of said action point about said fixed fulcrum.

2. A pressing machine comprising:

a lever apparatus including:

lever member having a fixed fulcrum, a moving force point and an action point;

means for rotatably supporting said fixed fulcrum at a stationary point;

a force point regulator including a roller rotatably mounted at said force point, and a pair of guide plates for rollably supporting the roller therebetween;

first means for linearly moving the pair of guide plates of said force point regulator while guiding the roller in the pair of guide plates along a rotation locus of said force point about said fixed fulcrum;

an action point regulator including a roller rotatably mounted at said action point, and a pair of guide plates for rollably supporting the roller of said action point regulator therebetween; and second means for linearly moving the pair of guide plates of said action point regulator while guiding the roller of the action point regulator in the guide plates of the action point regulator along a rotation locus of said action point about said fixed fulcrum;

a driving mechanism coupled to said force point regulator for transmitting linearly a driving force to said lever member via said force point; and a head coupled to said action point regulator so as to be driven linearly in accordance with a movement of said lever member.

3. A lever apparatus comprising:

a lever member having a fixed fulcrum, a moving force point and an action point;

means for rotatably supporting said fixed fulcrum at a stationary point;

a force point regulator including a slider rotatably mounted at said force point, and a pair of guide plates for movably supporting the slider therebetween;

first means for linearly moving the pair of guide plates of said force point regulator while guiding the slider in the pair of guide plates along a rotation locus of said force point about said fixed fulcrum;

an action point regulator including a slider rotatably mounted at said action point, and a pair of guide plates for movably supporting the slider of said action point regulator therebetween; and second means for linearly moving the pair of guide plates of said action point regulator while guiding the slider in the pair of guide plates along a rotation locus of said action point about said fixed fulcrum.

4. A pressing machine comprising:

a lever apparatus including:

a lever member having a fixed fulcrum, a moving force point and an action point;

means for rotatably supporting said fixed fulcrum at a stationary point;

a force point regulator including a slider rotatably mounted at said force point, and a pair of guide plates for movably supporting the slider therebetween;

first means for linearly moving the pair of guide plates of said force point regulator while guiding the slider in the pair of guide plates along a rotation locus of said force point about said fixed fulcrum;

an action point regulator including a slider rotatably mounted at said action point, and a pair of guide plates for movably supporting the slider of said action point regulator therebetween; and second means for linearly moving the pair of guide plates of said action point regulator while guiding the slider of the action point regulator in the guide plates of the action point regulator along a rotation locus of said action point about said fixed fulcrum;

a driving mechanism coupled to said force point regulator for transmitting linearly a driving force to said lever member via said force point; and a head coupled to said action point regulator so as to be driven linearly in accordance with a movement of said lever member.

* * * * *